US010812892B1

United States Patent
Lin et al.

(10) Patent No.: US 10,812,892 B1
(45) Date of Patent: Oct. 20, 2020

(54) WEARABLE DEVICE AND POWER SAVING METHOD FOR WEARABLE DEVICE

(71) Applicant: Merry Electronics(Shenzhen) Co., Ltd., ShenZhen (CN)

(72) Inventors: Mao-Hung Lin, Taichung (TW); Hung-Chi Lin, Taichung (TW); Sheng Chen, Taichung (TW); Meng-Wei Lin, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 16/528,658

(22) Filed: Aug. 1, 2019

(30) Foreign Application Priority Data

Apr. 17, 2019 (TW) .............................. 108113435 A

(51) Int. Cl.
*H04R 1/10* (2006.01)
*G06F 1/3206* (2019.01)
*G06F 1/16* (2006.01)

(52) U.S. Cl.
CPC ......... *H04R 1/1041* (2013.01); *G06F 1/3206* (2013.01); *H04R 1/1016* (2013.01); *G06F 1/163* (2013.01); *H04R 2460/03* (2013.01)

(58) Field of Classification Search
CPC H04R 1/1041; H04R 1/1016; H04R 2460/03; G06F 1/163; G06F 1/3206
USPC .......................................................... 381/74
See application file for complete search history.

(56) References Cited

U.S. PATENT DOCUMENTS 10,367,540 B1 * 7/2019 Medapalli ......... H04W 52/0251

\* cited by examiner

*Primary Examiner* — Paul Kim
(74) *Attorney, Agent, or Firm* — JCIPRNET

(57) ABSTRACT

A wearable device and a power saving method are proposed. The wearable device includes a sensor and a first processing unit. The sensor has a buffer. The first processing unit is coupled to the sensor. The first processing unit in a first hibernate mode is woken up after receiving a first signal, wherein the first processing unit includes an interrupting module. The interrupting module makes the first processing unit enter the first hibernate mode after commands, in response to the first signal, the sensor to start sensing so as to generate sense data, wherein the sensor wakes up the first processing unit from the first hibernate mode based on an amount of the sense data exceeding a threshold of the buffer, and the first processing unit enters the first hibernate mode after processing the sense data.

9 Claims, 2 Drawing Sheets

WEARABLE DEVICE AND POWER SAVING METHOD FOR WEARABLE DEVICE

CROSS-REFERENCE TO RELATED APPLICATION

This application claims the priority benefit of Taiwan application serial no. 108113435, filed on Apr. 17, 2019. The entirety of the above-mentioned patent application is hereby incorporated by reference herein and made a part of this specification.

BACKGROUND

Technical Field

The present invention relates to a power saving method, and more particularly to a wearable device and a power saving method suitable for the wearable device.

Description of Related Art

Currently, there are many wearable devices with various functions on the market. Many types of wearable devices can be used to measure physiological parameter of a user, and the measured sense data can be transmitted to a mobile device (e.g., a smart phone or a tablet) of the user via a wireless communication technology such as Bluetooth or Wi-Fi. An application installed in the user's mobile device can use the sense data to instantly determine related information such as the heart rhythm, the number of steps, the moving distance, or the sports information of the user.

However, the above-mentioned wearable device needs to be configured with various sensors to collect a large amount of sense data, and also needs to process sense data at the local end of the wearable device. Therefore, the power of the wearable device may be consumed quickly, thereby significantly reducing the usage time of the wearable device.

SUMMARY

The present invention provides a wearable device. The wearable device includes a sensor and a first processing unit. The sensor has a buffer. The first processing unit is coupled to the sensor. The first processing unit in a first hibernate mode is woken up after receiving a first signal, wherein the first processing unit includes an interrupting module. The interrupting module makes the first processing unit enter the first hibernate mode after commands, in response to the first signal, the sensor to start sensing so as to generate sense data, wherein the sensor wakes up the first processing unit from the first hibernate based on an amount of the sense data exceeding a threshold of the buffer, and the first processing unit enters the first hibernate mode after processing the sense data.

In an embodiment of the present invention, the wearable device further comprises a second processing unit. The second processing unit is coupled to the first processing unit. The second processing unit in a second hibernate mode transmits the first signal to the first processing unit after receiving a control command, wherein the second processing unit includes a communication module and an audio processing module. The communication module wakes up the second processing unit from the second hibernate mode after receiving the control command. The audio processing module receives an input audio signal to generate an output audio signal according to the input audio signal.

In an embodiment of the present invention, the first processing unit further includes an identification module. The identification module generates an identification result according to the sense data, wherein the first processing unit enters the first hibernate mode immediately after the identification module completes identifying the sense data.

In an embodiment of the present invention, the second processing unit enters the second hibernate mode after transmitting the first signal, the first processing unit transmits the identification result to the second processing unit and enters the first hibernate after generating the identification result according to the sense data, and the second processing unit enters the second hibernate mode after outputting the identification result via the communication module.

In an embodiment of the present invention, when the audio processing module processes an arbitrary audio signal, the second processing unit enters the second hibernate mode after completing processing the arbitrary audio signal.

In an embodiment of the present invention, the wearable device is an earbud.

In an embodiment of the present invention, when the first processing unit is not in the first hibernate mode and the second processing unit is not in the second hibernate mode, a power consumption of the wear device exceeds 40 milliamps. When the first processing unit is in the first hibernate mode and the second processing unit is not in the second hibernate mode, the power consumption of the wearable device is between 25 milliamps and 40 milliamps. When the first processing unit is not in the first hibernate mode and the second processing unit is in the second hibernate mode, the power consumption of the wearable device is between 20 milliamps and 30 milliamps.

In an embodiment of the present invention, the identification module determines whether a posture a user of the wearable device is correct according to the sense data, generates and transmits the identification result based on that the posture of the user is correct, and makes the first processing unit enters the first hibernate mode based on the posture of the user is not correct.

In an embodiment of the present invention, the sensor is one of an electronic compass, a geomagnetic sensor, a gyroscope, an angular velocity sensor, an acceleration sensor, a six-axis sensor, and a nine-axis sensor.

The present invention provides a power saving method suitable for use in a wearable device. The power saving method including: receiving a first signal to wake up a first processing unit from a first hibernate mode; making the first processing unit enter the first hibernate mode after commanding, in response to the first signal, a sensor to start sensing so as to generate sense data; waking up the first processing unit from the first hibernate mode based on an amount of the sense data exceeding a threshold; and making the first processing unit enter the first hibernate mode after the first processing unit processes the sense data.

In view of the above, the wearable device of the present invention wakes up the first processing unit and the second processing unit only when necessary (e.g., when the first processing unit and/or the second processing unit is required for receiving/transmitting data). Therefore, the power of the wearable device will be utilized in a most efficient manner.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
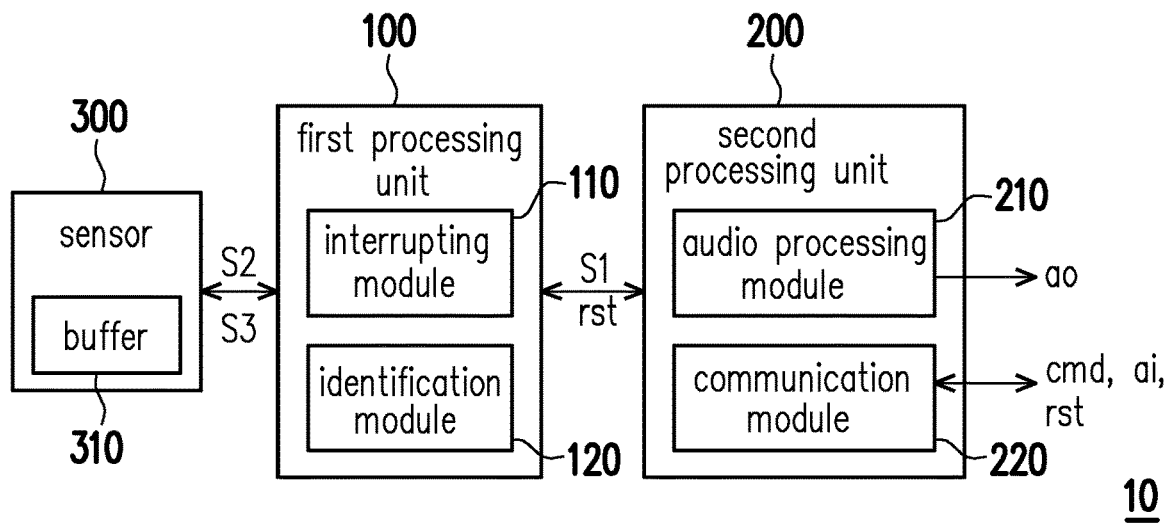
FIG. 1 is a schematic diagram illustrating a wearable device according to an embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

It should be understood that when an element is referred to as being "on another element," "connected to another element," or "overlapped to another element," it can be directly on or connected to the other element, or intervening elements may also be present. In contrast, when an element is referred to as being "directly on" or "directly connected to "another element, there are no intervening elements present. As used herein, the term "connected" may refer to physically connected and/or electrically connected. Furthermore, the "electrical connection" or "coupling" of the two elements may indicate that there are other elements between the two elements.

FIG. 1 is a schematic diagram illustrating a wearable device 10 according to an embodiment of the present invention. The wearable device 10 is, for example, an earphone, a smart bracelet, or smart glasses, but the present invention is not limited thereto. The wearable device 10 includes a first processing unit 100, a second processing unit 200, and a sensor 300.

A first processing unit 100 is, for example, a central processing unit (CPU), or other programmable micro control unit (MCU) of general purpose or special purpose, a microprocessor, a digital signal processor (DSP), a programmable controller, an application specific integrated circuit (ASIC), a graphics processing unit (GPU), an arithmetic logic unit (ALU) or other similar components or a combination thereof. The first processing unit 100 is coupled to the second processing unit 200 and the sensor 300, and includes a storage medium (not shown in the figure) for storing various software modules or applications. Specifically, the storage medium of the first processing unit 100 can store an interrupting module 110 and an identification module 120. The functions of the interrupting module 110 and the identification module 120 will be described in the following paragraphs.

The second processing unit 200 is, for example, a central processing unit, or other programmable micro control unit of general purpose or special purpose, a microprocessor, a digital signal processor, a programmable controller, an application specific integrated circuit, a graphic processing unit, an arithmetic logic unit, or other similar components or a combination thereof. The second processing unit 200 is coupled to the first processing unit 100 and includes a storage medium (not shown) for storing various software modules or applications. Specifically, the storage medium of the second processing unit 200 can store an audio processing module 210 and a communication module 220. The functions of the audio processing module 210 and the communication module 220 will be described in the following paragraphs.

The sensor 300 is, for example, an electronic compass, a geomagnetic sensor, a gyroscope, an angular velocity sensor, an acceleration sensor, a six-axis sensor, or a nine-axis sensor, but the present invention is not limited thereto. The sensor 300 is coupled to the first processing unit 100 and has a buffer 310 for buffering the sense data.

The first processing unit 100 is configured to generate an identification result rst according to the sense data received from the sensor 300. For example, if the wearable device 10 has the function of identifying whether a posture of a user is correct, the identification module 120 can determine whether the posture of the user is correct according to the sense data measured by the sensor 300 and associated with the posture of the user.

The first processing unit 100 has a first hibernate mode. Unless the first processing unit 100 is woken up or the first processing unit 100 is used to identify the sense data from the sensor 300, the first processing unit 100 may remain in the first hibernate mode, thereby lowering the first processing unit 100 power consumption. In an embodiment, the first processing unit 100 in the first hibernate mode only enables the function of receiving a signal for waking up the first processing unit 100, and other functions will be disabled to reduce the power consumption.

The first processing unit 100 in the first hibernate mode may be woken up by the second processing unit 200. Specifically, the first processing unit 100 in the first hibernate mode is woken up after receiving the first signal S1 from the second processing unit 200. The interrupting module 110 of the first processing unit 100 commands, in response to the first signal S1, the sensor 300 to start sensing so as to generate the sense data by transmitting a second signal S2 to the sensor 300. After transmitting the second signal S2, the interrupting module 210 may make the first processing unit 100 enter the first hibernate mode again.

On the other hand, the first processing unit 100 in the first hibernate mode may be woken up by the sensor 300. Specifically, the first processing unit 100 in the first hibernate mode is woken up after receiving a third signal S3 from the sensor 300. The awakened first processing unit 100 may receive the sense data from the sensor 300 and enter the first hibernate mode again after processing the sense data. More specifically, after receiving the sense data from the sensor 300, the identification module 120 of the first processing unit 100 generates the identification result rst according to the sense data. In an embodiment, the identification module 120 determines whether the posture of the user of the wearable device 10 is correct according to the sense data. The identification module 120 generates the identification result rst based on the posture of the user is correct and transmits the identification result rst to the second processing unit 200. After the identification module 120 completes identifying the sense data, the first processing unit 100 immediately enters the first hibernate mode. On the other hand, the identification module 120 can directly make the first processing unit 100 enter the first hibernate mode based on the posture of the user is not correct.

The second processing unit 200 is configured to process an audio signal. For example, assume that the wearable device 10 has the function of playing an audio signal. The second processing unit 200 can receive an input audio signal ai through the communication module 220. The audio processing module 210 can generate an output audio signal ao according to the input audio signal ai. The audio processing module 210 can play the output audio signal ao to the user through, for example, a speaker.

In an embodiment, the communication module 220 supports communication technologies including Bluetooth, ZigBee, Wi-Fi, or cellular network standard, but the present invention is not limited thereto.

The second processing unit 200 has a second hibernate mode. Unless the second processing unit 200 is woken up or the second processing unit 200 is used to process an audio signal (e.g., receiving an input audio signal ai, generating an output audio signal according to the input audio signal ai, or playing the output audio signal ao), the second processing unit 200 can remain in the second hibernate mode, thereby reducing the power consumption of the second processing unit 200. For example, if the audio processing module 210 of the second processing unit 200 is used to process an arbitrary audio signal, the second processing unit 200 enters the second hibernate mode after completing processing of the arbitrary audio signal. In an embodiment, the second processing unit 200 in the second hibernate mode only enables the function of receiving a signal for waking up the second processing unit 200, and other functions will be disabled to reduce the power consumption.

The second processing unit 200 in the second hibernate mode can be woken up by an external electronic device communicatively coupled to the wearable device 10. Specifically, the communication module 220 of the second processing unit 200 wakes up the second processing unit 200 from the second hibernate mode after receiving a control command from the external electronic device. For example, assume that the external electronic device is a smart phone. When the user wants to activate the function of identifying the posture of the user of the wearable device 10, the user can transmit the control command cmd to the wearable device 10 through the application of the smart phone. In response to the communication module 220 waking up the second processing unit 200 from the second hibernate mode after receiving the control command cmd, the second processing unit 200 transmits the first signal S1 to the first processing unit 100 to wake up the first processing unit 100. After the first signal S1 is transmitted, the second processing unit 200 enters the second hibernate mode again.

On the other hand, the second processing unit 200 in the second hibernate mode may be woken up by the first processing unit 100. Specifically, after the first processing unit 100 generates the identification result rst according to the sense data from the sensor 300, the first processing unit 100 transmits the identification result rst to the second processing unit 200 and enters the first hibernate mode. The second processing unit 200 is woken up after receiving the identification result rst from the first processing unit 100. The awakened second processing unit 200 enters the second hibernate mode again after outputting the identification result rst through the communication module 220.

In order to reduce the time that the first processing unit 100 is in an awake mode, the sensor 300 does not transmit the generated sense data to the first processing unit 100 immediately. The sensor 300 will wake up the first processing unit 100 after accumulating a certain amount of sense data and transmit the accumulated sense data to the first processing unit 100 at once. Specifically, after the sensor 300 receives the second signal S2 from the first processing unit 100, the sensor 300 starts collecting the sense data, and accumulates the sense data by using the buffer 310. After the amount of the sense data accumulated in the buffer 310 exceeding a threshold of the buffer 310, the sensor 300 wakes up the first processing unit 100 from the first hibernate mode through the third signal S3, and then transmits the accumulated sense data to the first processing unit 100.

The present invention can reduce the power consumption of the wearable device 10 by making the first processing unit 100 to be in the first hibernate mode and/or making the second processing unit 200 to be in the second hibernate mode. For example, if the wearable device 10 is an earbud, when the first processing unit 100 is not in the first hibernate mode and the second processing unit 200 is not in the second hibernate mode, the power consumption of the wearable device 10 may exceed 40 milliamps (mA). However, when the first processing unit 100 is in the first hibernate mode and the second processing unit 200 is not in the second hibernate mode, the power consumption of the wearable device 10 may be between 25 mA and 40 mA. When the first processing unit 100 is not in the first hibernate mode and the second processing unit 200 is in the second hibernate mode, the power consumption of the wearable device 10 may be between 20 mA and 30 mA.

Figure 2:
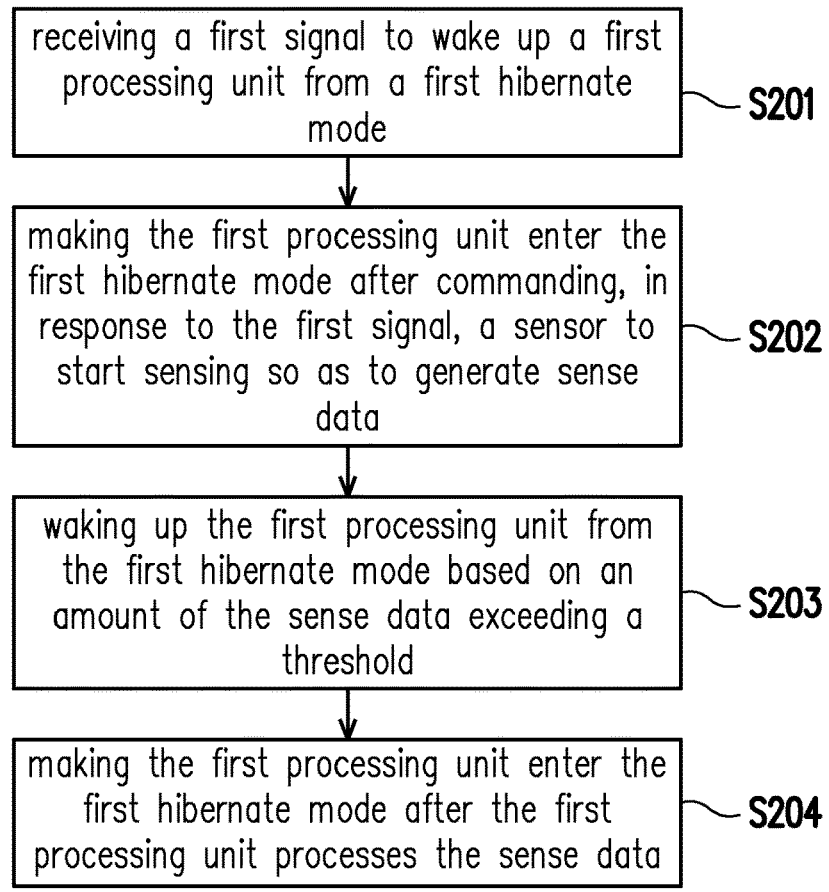
FIG. 2 is a flow chart illustrating a power saving method suitable for the wearable device according to an embodiment of the present invention.

FIG. 2 is a flow chart illustrating a power saving method suitable for the wearable device 10 according to an embodiment of the present invention. In step S201, the first processing unit 100 receives a first signal S1 to wake up the first processing unit 100 from a first hibernate mode. In step S202, the interrupting module 110 of the first processing unit 100 makes the first processing unit 100 enter a first hibernate mode after commanding, in response to the first signal S1, a sensor 300 to start sensing so as to generate sense data. In step S203, the sensor 300 wakes up the first processing unit 100 from the first hibernate mode based on an amount of the sense data exceeding a threshold. In step S204, the first processing unit 100 enters the first hibernate mode after processing the sense data.

Figure 3:
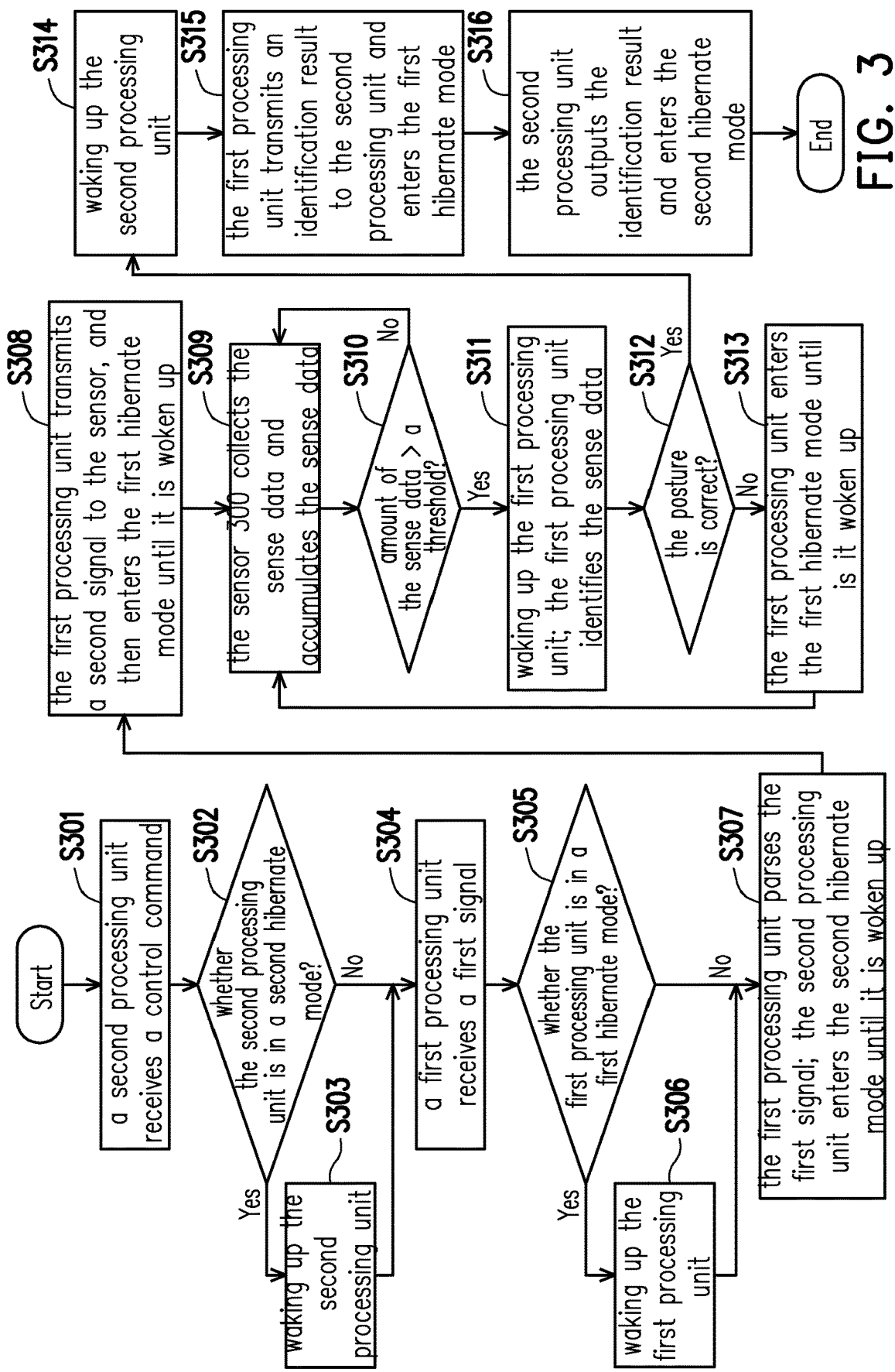
FIG. 3 is a flow chart illustrating the power saving method suitable for the wearable device in more detail according to an embodiment of the present invention.

FIG. 3 is a flow chart illustrating the power saving method suitable for the wearable device 10 in more detail according to an embodiment of the present invention.

In step S301, a second processing unit 200 receives a control command cmd through the communication module 220. The control command cmd is from, for example, an external electronic device communicatively coupled to the wearable device 10.

In step S302, a communication module 200 of the second processing unit 200 determines whether the second processing unit 200 is in a second hibernate mode in response to the control command cmd. If the second processing unit 200 is in the second hibernate mode, the process proceeds to step S303, the communication module 220 wakes up the second processing unit 200 from the second hibernate mode, and the process proceeds to step S304. If the second processing unit 200 is not in the second hibernate mode, the process proceeds directly to step S304.

In step S304, a first processing unit 100 receives a first signal S1 from the second processing unit 200.

In step S305, the interrupting module 110 of the first processing unit 100 determines whether the first processing unit 100 is in a first hibernate mode in response to the first signal S1. If the first processing unit 100 is in the first hibernate mode, the process proceeds to step S306, the interrupting module 110 wakes up the first processing unit 100 from the first hibernate mode, and the process proceeds to step S307. If the first processing unit 100 is not in the first hibernate mode, the process proceeds directly to step S307.

In step S307, the first processing unit 100 parses the first signal S1. The second processing unit 200 enters the second hibernate mode after transmitting the first signal S1 until it is woken up. The first signal S1 is associated with the control command cmd. The first processing unit 100 can be triggered by parsing the first signal S1, so that the first processing unit 100 will command the sensor 300 to start sensing the user so as to generate sense data.

In step S308, the first processing unit 100 transmits a second signal S2 to the sensor 300, and then enters the first hibernate mode until it is woken up.

In step S309, the sensor 300 collects the sense data in response to the second signal S2, and accumulates the sense data through the buffer 310.

In step S310, the sensor 300 determines whether an amount of the sense data accumulated in the buffer 310 exceeds a threshold of the data buffer. If the amount of sense data exceeds the threshold, the process proceeds to step S311. If the amount of data of the sense data does not exceed the threshold, keep performing step S309 to accumulate more sense data.

In step S311, the sensor 300 wakes up the first processing unit 110 in the first hibernate mode, and transmits the accumulated sense data to the first processing unit 110. The identification module 120 of the first processing unit 100 identifies the sense data so as to determine whether a posture of a user is correct.

In step S312, the identification module 120 of the first processing unit 110 determines whether the posture of the user is correct according to the sense data. If the posture of the user is correct, the process proceeds to step S314. If the posture of the user is not correct, the process proceeds to step S313.

In step S313, the first processing unit 100 enters the first hibernate mode until it is woken up, and the process returns to step S309.

In step S314, the first processing unit 100 wakes up the second processing unit 200 from the second hibernate mode.

In step S315, the first processing unit 100 transmits an identification result rst corresponding to a correct posture of the user to the second processing unit 200, and enters the first hibernate mode after transmitting the identification result rst. In an embodiment, if the first processing unit 100 still needs to identify sense data after transmitting the identification result rst to the second processing unit 200, the first processing unit 100 enters the first hibernate mode immediately after completing identifying said sense data.

In step S316, the second processing unit 200 outputs the identification result rst through the communication module 220, and enters the second hibernate mode after outputting the identification result rst. For example, the second processing unit 200 can output the identification result rst to a smart phone connected to the wearable device 10 through the communication module 220, so that the user can learn the identification result rst through the smart phone. Therefore, the user can determine whether his or her own posture is correct according to the recognition result rst. In one embodiment, if the second processing unit 200 still needs to process an audio signal after outputting the identification result rst, the second processing unit 200 enters the second hibernate mode immediately after completing processing said audio data.

In summary, the first processing unit and the second processing unit of the wearable device of the present invention may have a first hibernate mode and a second hibernate mode, respectively. The first processing unit and the second processing unit can be woken up from the hibernate mode to perform the necessary functions if there is a control signal or data needs to be received and/or transmitted. If there is no control signal or data needs to be received and/or transmitted, the first processing unit and the second processing unit may enter the first hibernate mode and the second hibernate mode respectively, thereby significantly reducing the power consumption of the wearable device.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wearable device comprising:
    a sensor having a buffer;
    a first processing unit coupled to the sensor, the first processing unit in a first hibernate mode is woken up after receiving a first signal, wherein the first processing unit comprising:
    an interrupting module, making the first processing unit enter the first hibernate mode after commanding, in response to the first signal, the sensor to start sensing so as to generate sense data, wherein the sensor wakes up the first processing unit from the first hibernate mode based on an amount of the sense data exceeding a threshold of the buffer, and the first processing unit enters the first hibernate mode after processing the sense data;
    a second processing unit coupled to the first processing unit, the second processing unit in a second hibernate mode transmits the first signal to the first processing unit after receiving a control command, wherein the second processing unit comprising:
    a communication module, waking up the second processing unit from the second hibernate mode after receiving the control command; and
    an audio processing module, receiving an input audio signal to generate an output audio signal according to the input audio signal.

2. The wearable device according to claim 1, wherein the first processing unit further comprising:
    an identification module, generating an identification result according to the sense data, wherein the first processing unit enters the first hibernate mode immediately after the identification module completes identifying the sense data.

3. The wearable device according to claim 1, wherein the second processing unit enters the second hibernate mode after transmitting the first signal, the first processing unit transmits an identification result to the second processing unit and enters the first hibernate mode after generating the identification result according to the sense data, and the second processing unit enters the second hibernate mode after outputting the identification result via the communication module.

4. The wearable device according to claim 1, wherein when the audio processing module processes an arbitrary audio signal, the second processing unit enters the second hibernate mode after completing processing the arbitrary audio signal.

5. The wearable device according to claim 1, wherein the wearable device is an earbud.

6. The wearable device according to claim 5, wherein when the first processing unit is not in the first hibernate mode and the second processing unit is not in the second hibernate mode, a power consumption of the wearable device exceeds 40 milliamps;

when the first processing unit is in the first hibernate mode and the second processing unit is not in the second hibernate mode, the power consumption of the wearable device is between 25 milliamps and 40 milliamps; and when the first processing unit is not in the first hibernate mode and the second processing unit is in the second hibernate mode, the power consumption of the wearable device is between 20 milliamps and 30 milliamps.

7. The wearable device according to claim 2, wherein the identification module determines whether a posture of a user of the wearable device is correct according to the sense data, generates and transmits the identification result based on the posture of the user is correct, and makes the first processing unit enters the first hibernate mode based on the posture of the user is not correct.

8. The wearable device according to claim 1, wherein the sensor is one of an electronic compass, a geomagnetic sensor, a gyroscope, an angular velocity sensor, an acceleration sensor, a six-axis sensor, and a nine-axis sensor.

9. A power saving method suitable for a wearable device, the power saving method comprising:

receiving a first signal to wake up a first processing unit from a first hibernate mode;

making the first processing unit enter the first hibernate mode after commanding, in response to the first signal, a sensor to start sensing so as to generate sense data;

waking up the first processing unit from the first hibernate mode based on an amount of the sense data exceeding a threshold;

making the first processing unit enter the first hibernate mode after the first processing unit processes the sense data;

a second processing unit coupled to the first processing unit, the second processing unit in a second hibernate mode transmits the first signal to the first processing unit after receiving a control command;

waking up the second processing unit from the second hibernate mode after receiving the control command; and receiving an input audio signal to generate an output audio signal according to the input audio signal.

* * * * *